US012605008B2

(12) United States Patent
Tessicini et al.

(10) Patent No.: US 12,605,008 B2
(45) Date of Patent: Apr. 21, 2026

(54) GRINDING DEVICE, PARTICULARLY FOR COFFEE OR THE LIKE, AND SYSTEM FOR DISPENSING COFFEE COMPRISING SUCH A DEVICE

(71) Applicant: FLUID-O-TECH S.R.L., Corsico (IT)

(72) Inventors: Fabrizio Tessicini, Imola (IT); Diego Andreis, Milan (IT)

(73) Assignee: FLUID-O-TECH S.R.L., Corsico (IT)

( * ) Notice: Subject to any disclaimer, the term of this patent is extended or adjusted under 35 U.S.C. 154(b) by 854 days.

(21) Appl. No.: 17/934,338

(22) Filed: Sep. 22, 2022

(65) Prior Publication Data

US 2023/0087585 A1     Mar. 23, 2023

(30) Foreign Application Priority Data

Sep. 23, 2021     (IT) ......................... 102021000024474

(51) Int. Cl.
*A47J 31/42* (2006.01)
*A47J 42/18* (2006.01)
*A47J 42/08* (2006.01)

(52) U.S. Cl.
CPC ............... *A47J 31/42* (2013.01); *A47J 42/18* (2013.01); *A47J 42/08* (2013.01)

(58) Field of Classification Search
CPC .. A47J 31/42; A47J 42/08; A47J 42/18; A47J 42/52
See application file for complete search history.

(56) References Cited

U.S. PATENT DOCUMENTS

| | | | |
|---|---|---|---|
| 10,213,047 B2 | 2/2019 | Boggavarapu | |
| 2023/0017236 A1* | 1/2023 | Oilmaghani | ............ A47J 42/50 |

FOREIGN PATENT DOCUMENTS

| | | | |
|---|---|---|---|
| CN | 211883424 U | * 11/2020 | .............. A47J 31/02 |
| EP | 0455025 A1 | 11/1991 | |
| EP | 3042591 A1 | 7/2016 | |
| EP | 3586693 A1 | 1/2020 | |
| WO | 2007027206 A2 | 3/2007 | |

* cited by examiner

*Primary Examiner* — Reginald Alexander
(74) *Attorney, Agent, or Firm* — CANTOR COLBURN LLP

(57) ABSTRACT

A coffee grinder device
    includes a tank of coffee beans,
        at least one grinding member adapted to grind a quantity of coffee beans to obtain a coffee powder,
        a grain size adjustment device adapted to adjust at least one operating parameter of the grinding member to vary the grain size of the coffee powder (7), and
        a dispensing opening adapted to deliver the coffee powder towards a container adapted to receive the coffee powder.
The coffee grinder device also includes in correspondence with or downstream of the dispensing opening, an optical grain size sensor adapted to intercept the coffee powder exiting the dispensing opening and to generate at least a signal indicative of the grain size of the coffee powder. The grain size of the coffee powder is selectable by the grain size adjustment device on the basis of the signal indicative of the grain size of the coffee powder.

16 Claims, 2 Drawing Sheets

GRINDING DEVICE, PARTICULARLY FOR COFFEE OR THE LIKE, AND SYSTEM FOR DISPENSING COFFEE COMPRISING SUCH A DEVICE

CROSS-REFERENCE TO RELATED APPLICATIONS

This application claims priority to Italian Patent Application No. 102021000024474, filed on Sep. 23, 2021, the contents of which are hereby incorporated by reference in their entirety.

TECHNICAL FIELD

The present disclosure refers to a grinding device, particularly for coffee, or the like, to a system for dispensing coffee comprising such a device, and to a method of grinding by means of such a device.

For the purposes of this disclosure, it should be made clear that the grinding device is not limited to applications on coffee, but applications in a broader sense should also be considered, although in the following, for convenience, reference will be made to coffee, and the grinding device will also be referred to, for convenience, as a coffee grinder device.

BACKGROUND

As is well known, espresso coffee is prepared by loading and pressing a dose of ground coffee powder into a cup-shaped filter with a micro-perforated bottom. By means of a filter holder, this filter is associated with a delivery group of an espresso coffee dispensing machine. Espresso coffee is obtained by passing (i.e. percolating) hot water under pressure through the dose of coffee powder contained in the filter.

Coffee powder is generally obtained starting from coffee beans or grains that are ground with a coffee grinder device at the time when espresso coffee is being prepared, in order to preserve the aromas and the organoleptic properties of the coffee beans.

Coffee grinder devices of known type generally comprise a tank of coffee beans and grinding members, through which the coffee beans are ground into powder. The grinding members of known type generally comprise a pair of grinders, at least one of which is dragged into rotation by means of a motor.

Some of the coffee grinder devices of known type are able to vary the grain size of the powder obtained by grinding coffee beans, for example through means adapted to modify the mutual distance between the grinders.

As is also known, the adjustment of the grinding of the coffee beans is functional to the correct preparation of espresso coffee. In fact, the preparation of a good espresso coffee depends on many factors, including, in addition to the pressure and temperature of the water, the correct quantity of coffee powder contained in the filter, its grain size and the correct distribution of the coffee powder in the filter.

With reference to the grain size of the coffee powder, in fact, the extraction of aromas and organoleptic substances from the coffee powder also depends on the water/coffee powder contact surface and therefore an excessive grain size will result in an insufficient extraction, whereas a too fine grain size will result in an over-extraction, not optimal, and the production of an excessively strong and full-bodied beverage. An optimal coffee therefore requires a precise balance of at least the parameters listed above (i.e., temperature and pressure of the water, weight and grain size of the dose of coffee powder). The grain size of the coffee powder in fact affects the hydraulic conditions of the percolation, and in particular it affects the pressure drop of the percolation water and consequently it affects the flow rate provided by the pump.

The correct distribution of the coffee powder inside the filter also significantly affects the water percolation phase. Often, due to electrostatic forces, the coffee powder tends to aggregate, according to the so-called "clumping" phenomenon, forming lumps that make the distribution thereof inside the filter uneven. This results in the formation of preferential water percolation pathways through coffee powder, which affect the good extraction of aromas and organoleptic substances.

Currently, baristas manually adjust the grain size of the coffee powder by means of a graduated knob, or an adjustment ring, which, for example, brings the grinders of the grinding device closer or further away from each other. This manual adjustment to obtain an optimal percolation of the coffee is, however, largely based solely on the experience of the barista, who for example monitors the average time required for the standard filling of a cup of espresso coffee, which should be about 20 seconds. Shorter times indicate that the grain size is probably excessive. On the contrary, longer times indicate that the grain size is too fine and the percolation of hot water under pressure is not taking place in an optimal way.

Generally the barista adjusts the grinding grain size at the beginning of the working day. However, such an adjustment does not take into account the fact that the surrounding conditions (e.g., temperature and humidity of the environment and/or of the coffee beans, temperature of the coffee grinder device itself) for the preparation of a good espresso coffee change throughout the day and consequently also the fracture dynamics of the coffee beans vary.

However, there are also coffee dispensing machines that measure and calculate the average value of the flow rate of the dispensing water for a certain number of deliveries, for example 10 or 15, and compare it with an ideal value. The adjustment of the coffee grinder device is then carried out on the basis of the deviations between the measured average value and the ideal value, so as to suitably vary the grain size of the coffee powder. However, this is an indirect and imprecise measure that is necessarily influenced by multiple further external factors that affect the flow rate of the dispensing water, such as, first of all, the pressure of the water in the coffee dispensing machine, but also the temperature and the humidity of the environment and of the coffee powder, as well as the distribution of the powder inside the filter.

For example, a variation in the flow rate could be induced by phenomena linked to the pumping of the water and not to the grain size of the powder, therefore the case might happen in which a variation in the weight of the coffee is commanded when instead the variation in the flow rate of dispensing water depends on a poor distribution of the powder inside the filter.

In addition, the need to calculate the average of the flow rate values on a certain number of coffee deliveries means that the individual deliveries of espresso coffee between one check and the other can undergo sub-optimal fluctuations.

The prior art document EP3042591 concerns a method of adjusting the fineness of a coffee grinder associated with an espresso coffee dispensing machine comprising a system for detecting the shape of the liquid coffee trickle percolating from the espresso coffee dispensing machine, for example from the spout of a filter holder containing the dose of coffee powder. Based on the detection of the shape of the coffee trickle, according to what is described in EP3042591, the grinding fineness adjustment can be varied. Also this system suffers from the drawbacks mentioned above, since the shape of the espresso coffee trickle depends on a multiplicity of phenomena and factors that are neither directly nor indirectly uniquely associated with the fineness of the coffee powder, first and foremost the clumping phenomenon, or the imminent emptying of the coffee bean tank, which leads to grindings that are no longer homogeneous; moreover, since the correlation between grain size and shape of the percolating coffee liquid is not known, the finesse adjustment is carried out in an absolutely empirical and non-repeatable way.

SUMMARY

The present disclosure provides a grinding device, particularly for coffee or the like, which obviates the drawbacks and overcomes the limitations of the prior art allowing to obtain a direct measurement of the grain size of the ground powder.

As part of this main task, the present disclosure realizes a grinding device whose grinding adjustment can be performed in near real-time feedback.

The disclosure also provides a grinding device that is able to precisely deliver a desired dose of ground powder.

The disclosure further provides a grinding device that is integrated and/or can be integrated into a system for dispensing espresso coffee, in which the grain size of the coffee powder is directly measurable and in which the adjustment of the grain size of the coffee powder can be made in near real time, also taking into account other espresso coffee dispensing parameters, such as for example pressure, flow rate and water temperature.

The disclosure provides a grinding device that is able to give the broadest guarantees of reliability and safety in use.

the disclosure further provides a grinding device that is able to intercept clumping phenomena of the delivery of ground powder.

The disclosure provides a coffee grinder device that is able to detect in advance the depletion of coffee beans, providing an alarm to the operator and temporarily blocking their grinding.

The disclosure also provides a grinding device that is easy to realise and integrate into espresso coffee dispensing machines, as well as economically competitive when compared to the prior art.

The above task, as well as the advantages mentioned and others that will appear better later, are achieved by providing a grinding device, particularly for coffee or the like, as set forth in the claims, by a method of grinding coffee beans by means of such a device, as set forth in the claims, as well as by a system for dispensing coffee comprising such a grinding device as set forth in the claims.

Other features are provided in the dependent claims.

BRIEF DESCRIPTION OF THE DRAWINGS

Further features and advantages shall be more apparent from the description of a preferred, but not exclusive, embodiment of a coffee grinding device, illustrated merely by way of non-limiting example with the aid of the accompanying drawings, in which.

DETAILED DESCRIPTION OF THE DRAWINGS

Figures 1, 1A:
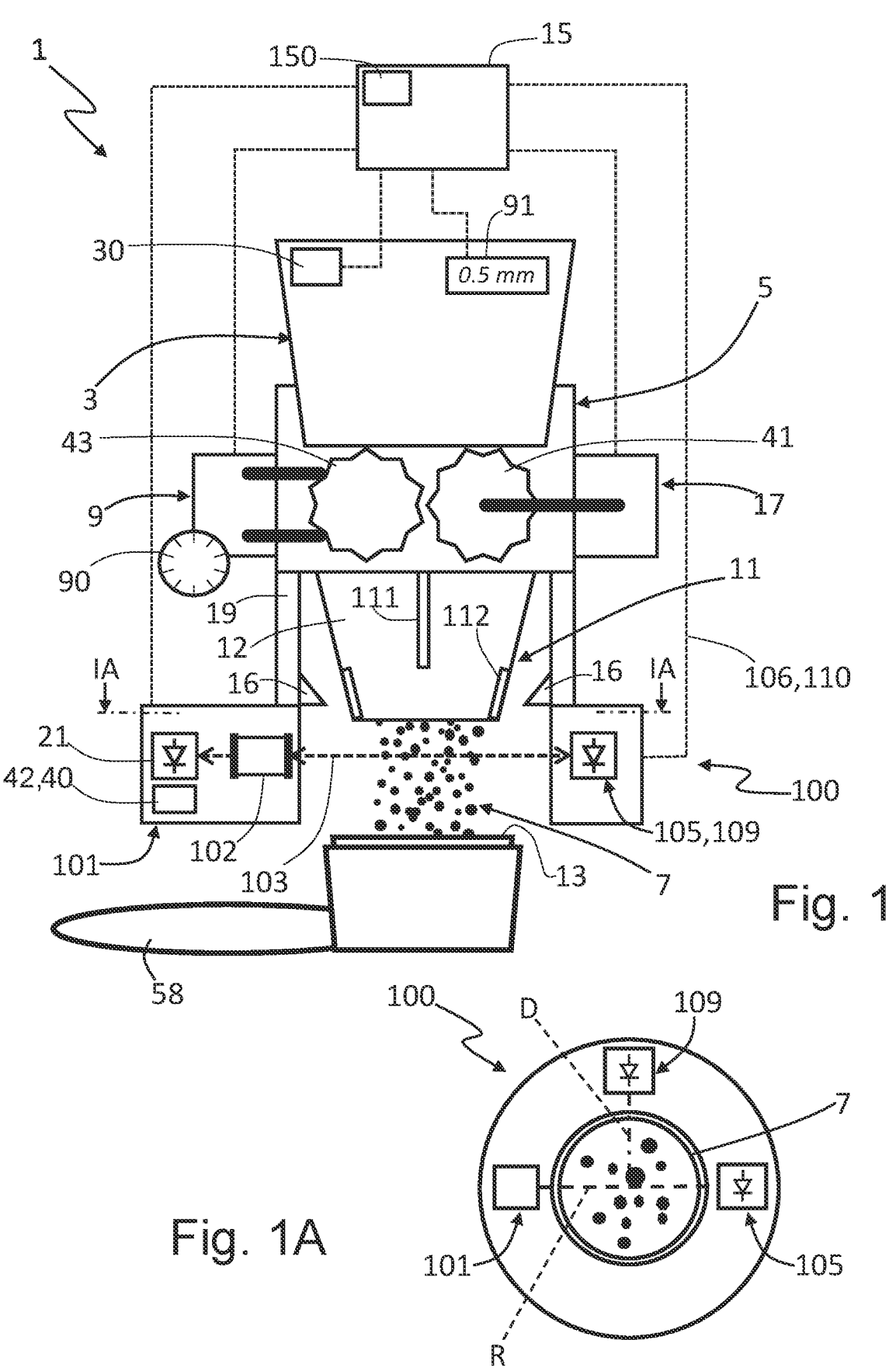
FIG. 1 schematically illustrates a first embodiment of a grinding device, particularly for coffee, according to the disclosure.
FIG. 1A is a schematic sectional view of the grinding device depicted in FIG. 1 made according to axis IA-IA.

With reference to the mentioned figures, the grinding device, indicated globally with reference numeral 1, comprises:

a tank 3 of coffee beans (or other types of beans to be ground), at least a grinding member 5 adapted to grind a quantity of coffee beans contained in the tank 3 in order to obtain a coffee powder 7, a grain size adjustment device 9 adapted to adjust at least one operating parameter of the grinding member 5 in order to vary the grain size of the coffee powder 7, a dispensing opening 11 adapted to deliver the coffee powder 7 towards a container, such as for example a filter 13 housed in a corresponding filter holder 58 of a coffee dispensing machine, adapted to receive said coffee powder 7.

According to the disclosure, the device 1 comprises, in correspondence with or downstream of the dispensing opening 11, an optical grain size sensor 100 adapted to intercept the coffee powder 7 exiting the dispensing opening 11 and to generate at least a signal indicative of the grain size of said coffee powder 7. The grain size of the coffee powder 7 is selectable by means of the grain size adjustment device 9 on the basis of the aforesaid signal indicative of the grain size of the coffee powder 7.

Advantageously, the dispensing opening 11 comprises a funnel element 12, for example of truncated conical shape, adapted to convey, by gravimetric fall, the coffee powder 7 towards a container, such as, according to the example described, the filter 13 of a coffee dispensing machine.

Advantageously, the coffee powder 7 can be dispensed from the dispensing opening 11 by means of a forced powder blowing system, possibly in combination with the presence of the funnel element 12. In fact, the delivery of the coffee powder 7 by gravimetric fall can also be assisted by a forced blowing system.

Advantageously, the optical sensor can be placed downstream of the funnel element 12, so as to intercept the coffee powder 7 that falls by gravity along the funnel element 12, but exiting the same, or it can be placed in correspondence with the funnel element 12, for example inside the same, associated with its walls, so as to intercept the coffee powder 7 that falls by gravity along the funnel element 12 inside it.

As schematically illustrated in the accompanying figures, the grinding device 1 advantageously comprises a support structure 19 that supports the optical sensor 100 so that it is placed downstream of the dispensing opening 11, and in particular downstream of the funnel element 12.

The grain size adjustment device 9 can be operated manually by an operator, or automatically.

In the first case, the grain size adjustment device 9 can be operated by means of a graduated knob 90, so that the operator can manually adjust the grain size on the basis of the signal indicative of the grain size of the coffee powder 7. In fact, as schematically illustrated in FIG. 1, the coffee grinder device 1 may also comprise display means 91 for displaying such a signal, or preferably a current grain size value, such as for example an average grain size value, obtained starting from such a signal detected by the sensor 100.

In essence, therefore, the operator, by reading on the display means 91 a datum that is referable to the grain size of the coffee powder 7 that is being ground, or that has just been ground to obtain a dose of coffee powder can manually intervene on the graduated knob 90 to vary, depending on the needs, the grain size of the coffee powder 7.

Preferably the grain size adjustment device 9 is operated automatically, as described below.

Advantageously, the manual and automatic operating modes of the grain size adjustment device 9 can coexist.

Advantageously, the grinding device 1 comprises a processing and control unit 15 connected to the optical grain size sensor 100, and configured (i) to receive the signal indicative of the grain size of the coffee powder 7 and (ii) to adjust the operation of the grain size adjustment device 9 on the basis of such signal indicative of the grain size of the coffee powder 7.

In this way, the grain size adjustment device 9 operates automatically, in feedback on the basis of the signal indicative of the grain size of the coffee powder 7 detected by the optical grain size sensor 100.

Advantageously, the grinding device 1 comprises a processing and control unit 15 configured (i) to receive a signal indicative of a reference grain size for the coffee beans and (ii) to adjust the operation of the grain size adjustment device 9 on the basis of such a signal indicative of said reference grain size for the coffee beans.

In this way, the grain size of the coffee powder 7 can be automatically selected by means of the grain size adjustment device 9, on the basis of the signal indicative of the reference grain size for the coffee beans to be ground.

In essence, the at least one operating parameter of the grinding member 5 can be initialized by the processing and control unit 15 on the basis of the signal indicative of the reference grain size.

The signal indicative of the reference grain size for the coffee beans to be ground is advantageously associated with the batch of coffee beans to be ground and is advantageously attributed to that batch by the roaster. Advantageously, the signal indicative of the reference grain size for the coffee beans to be ground is a standard grain size value, that is, a grain size value that under standard coffee dispensing conditions (e.g., standard temperature and/or standard ambient humidity conditions) allows obtaining an optimal extraction of the aromas and of the organoleptic properties of the coffee.

Advantageously, the grinding device 1 may comprise an optical reader 30 configured to read a code associated with the coffee beans, where the signal indicative of the reference grain size for said coffee beans is processed by the processing and control unit 15 on the basis of said code.

Advantageously, this code can be a two-dimensional bar code or a QR code associated with a batch of coffee beans, or with a pack of coffee beans.

The present disclosure also concerns a method of grinding coffee beans by means of a grinding device 1 as described above, comprising the steps of:
  (i) selecting a desired grain size value for the coffee powder 7;
  (ii) acquiring, from the optical grain size sensor 100, the signal indicative of the grain size of the coffee powder

7 exiting the dispensing opening 11, i.e. in gravimetric fall from the funnel element 12, towards the container, or filter, 13;
  (iii) obtaining a current grain size value of the coffee powder 7 exiting the dispensing opening 11 on the basis of said signal;
  (iv) comparing the current grain size value with the desired grain size value;
  (v) manually or automatically operating the grain size adjustment device 9 to vary the current grain size of the coffee powder 7 on the basis of the comparison of the current grain size value with the desired grain size value.

In case of manual operation of the grain size adjustment device 9, step (i), step (iv) and step (v) are performed by the operator himself, who chooses the desired grain size value, compares it with the current one detected by the sensor 100, and displayed by means of the display means 91 during the grinding of the coffee, and manually operates the graduated knob 90 to adjust the grinding grain size and bring it to the desired grain size value.

Advantageously, the display means 91 are configured to suggest to the operator how to adjust the graduated knob 90 to bring the grain size of the coffee powder 7 to the desired value, for example, in the case of a graduated knob 90 that can be operated in steps, visually suggesting how many steps to rotate the knob and in which direction.

In case of automatic operation of the grain size adjustment device 9, step (i) of selecting a desired grain size value for the coffee powder 7 may comprise the step of providing the desired grain size value as input to the control and processing unit 15, for example by means of the same graduated knob 90, electrically connected to the processing and control unit 15, or by means of a digital keypad. Steps (ii), (iii), (iv) and (v), on the other hand, are carried out by means of the processing and control unit 15.

Advantageously, step (ii) of acquiring, from the grain size optical sensor 100, the signal indicative of the grain size of the coffee powder 7 exiting the dispensing opening 11, towards the container, or filter, 13, also comprises the step of identifying agglomerates of coffee powder 7 resulting from the clumping phenomenon. Advantageously, the display means 91 are configured to show the operator a datum indicative of the presence, and preferably of the number and/or size, of such agglomerates, so that the operator can, for example, more forcefully compress the coffee powder 7 collected in the filter 13 before proceeding with the dispensing of the coffee, or take other measures to break up such agglomerates before brewing and percolating water.

Advantageously, the method of grinding coffee beans comprises the steps of:
  (a) receiving a signal indicative of a reference grain size for the coffee beans to be ground;
  (b) adjusting the operation of said grain size adjustment device 9 on the basis of said signal indicative of said reference grain size for said coffee beans.

Advantageously, step (a) comprises the step of reading a code associated with the coffee beans, by means of an optical reader 30, and of processing, by means of the processing and control unit 15, on the basis of said code, the signal indicative of the reference grain size for the coffee beans to be ground.

In the case of both manual operation and automatic operation of the grain size adjustment device 9, step (i) of selecting a desired grain size value for the dose of coffee powder 7 may comprise the step of providing as input to the control and processing unit 15 an initial value of reference grain size, standard, for the beans to be ground, for example by reading, with the optical reader 30, the code associated with the coffee beans to be ground.

Advantageously, the optical grain size sensor 100 comprises a radiation source 101 adapted to generate a radiation 103 that strikes the coffee powder 7 exiting the dispensing opening 11, that is in gravimetric fall from the funnel element 12, along an irradiation direction R incident to the fall direction of the coffee powder 7.

Advantageously, the sensor 100 can comprise a front photodiode 105 placed along the irradiation direction R, on a side opposite to the radiation source 101 with respect to the exiting coffee powder 7, wherein said front photodiode 105 generates a first electrical signal 106 dependent on the radiation part that passes through the coffee powder 7 exiting the dispensing opening 11 towards the container, or filter, 13.

Advantageously, the sensor 100 may comprise a side photodiode 109 placed along a diffusion direction D substantially orthogonal to the irradiation direction R, wherein said side photodiode 109 generates a second electrical signal 110 dependent on the radiation part that is diffused by the coffee powder 7 exiting the dispensing opening 11 towards the container, or filter, 13 substantially along the diffusion direction D.

The processing and control unit 15 connected to the grain size optical sensor 100 is configured (i) to receive the first electrical signal 106 generated by the front photodiode 105 and/or the second electrical signal 110 generated by the side photodiode 109 and (ii) to process the aforesaid signal indicative of the grain size of the coffee powder 7 on the basis of said first electrical signal 106 and/or said second electrical signal 110.

Preferably, the optical grain size sensor 100 comprises both the front photodiode 105 and the side photodiode 106, and the signal indicative of the grain size of the coffee powder 7 is processed on the basis of both the first electrical signal 106 generated by the front photodiode 105 and the second electrical signal 110 generated by the side photodiode 106.

Advantageously, the aforesaid signal indicative of the grain size of the coffee powder 7 on the basis of the electrical signals 106, 110 generated by the two sensors 105, 109 is processed by means of an algorithm loaded on the processing and control unit 15. Advantageously, the signal indicative of the grain size of the coffee powder 7 consists of an average proportional value of the grain size of the coffee powder 7 falling from the dispensing opening 11. Advantageously, this average proportional value is calculated substantially instantaneously, i.e. over a fraction of a second, for example in a range between 10 and 500 milliseconds, preferably between 50 and 200 milliseconds, even more preferably of about 100 milliseconds.

In this way the adjustment of the grain size of the coffee powder can be carried out between the grinding of one dose of coffee powder and the next, but also, depending on the response latency of the grinding member, during a single grinding.

Advantageously, the method of grinding coffee beans comprises the step of processing, by means of the processing and control unit 15, the signal indicative of the grain size of the coffee powder 7 to estimate a signal indicative of the quantity of ground coffee powder 7.

Advantageously, this step comprises the step of integrating over time the signal indicative of the grain size of the coffee powder 7 to estimate the quantity, by weight, of coffee powder 7 that is ground, also taking into account the speed of fall of the coffee powder particles 7, detectable by the optical sensor 100.

Advantageously, the optical sensor 100 may comprise a pair of front photodiodes 105 placed on one side opposite to the radiation source 101, at a certain distance from each other along the exit direction, i.e. along the gravimetric fall direction, of the coffee powder 7. Both these front photodiodes 105 intercept the radiation part of the source 101 that passes through the coffee powder 7 exiting the dispensing opening 11 along irradiation directions R. The correlation of the electrical signals generated by the two front photodiodes 105 placed in a spatial sequence allows in fact to estimate the speed of fall of the coffee powder 7 very accurately.

In essence, by appropriately integrating over time the signal indicative of the grain size of the coffee powder 7 being ground, exiting the dispensing opening 11, it is possible to estimate the quantity of coffee powder 7 that has been ground and then deliver a correct dose of coffee powder 7 in the filter 13, without the need to resort to scales or other weight measuring devices.

The expression "dose of coffee powder" generally refers to a specific quantity of coffee powder needed to make a single espresso coffee, a double espresso coffee, or two coffees simultaneously in case of a filter holder 58 with double dispensing spout.

Alternatively, the grinding device 1 can also be configured to deliver a specific dose of coffee powder simply by means of a timer that interrupts the grinding of the coffee beans after a certain period of time.

Advantageously, the radiation source 101 comprises a laser source, and the radiation 103 therefore comprises a laser light beam. In this case, the front photodiode 105 generates a first electrical signal 106 that depends on the modulation of the power of the laser light beam operated, according to a retro-injection interferometry effect (so-called self-mix effect), from the particles of the coffee powder 7 exiting the dispensing opening 11, towards the filter 13.

This also makes it possible to detect the presence and the quantity of coffee powder particles 7 in the micrometre order.

Advantageously, the laser source is a semiconductor laser source comprising a laser cavity 102, adapted to generate the aforesaid laser light beam.

Advantageously, the optical grain size sensor 100 comprises a radiation source 101 comprising a laser source, and a monitor photodiode 21 associated with the laser source.

Advantageously, the monitor photodiode 21 is integrated into the laser source and arranged upstream of the laser cavity 102 of the laser source.

The monitor photodiode 21 is adapted to generate an electrical signal also dependent on the modulation of the power of the laser light beam (so-called self-mix signal). In this case, the processing and control unit 15 is programmed to also process the electrical signal generated by the monitor photodiode 21 to improve the signal-to-noise ratio of the signal indicative of the quantity of coffee powder particles 7 in gravimetric fall.

In fact, the front photodiode 105 and the monitor photodiode 21 both measure the amplitude modulations of the laser light beam induced by the self-mix effect. However, these modulations have opposite signs between them. Therefore, by calculating the difference between the two self-mix signals detected by the front photodiode 105 and by the monitor photodiode 21, a gain of factor two on the amplitude of the self-mix signal is obtained, and also a subtraction of all common disturbances is obtained, such as noise and disturbances of the power supply of the laser source, as well as the "shot-noise" and the "1/f" noise of the laser itself.

Advantageously, the monitor photodiode 21 associated with the laser source is adapted to generate an electrical signal dependent on the radiation part that passes through the coffee powder 7 exiting the dispensing opening 11. In other words, the monitor photodiode 21 may generate a signal equivalent to that generated by the front photodiode 105, and thus usable as an alternative to the signal generated by the front photodiode 105 to process the signal indicative of the grain size of the coffee powder 7.

The processing and control unit 15 may then also be configured to receive such an electrical signal from the monitor photodiode 21 and to process the signal indicative of the grain size of the coffee powder 7 on the basis of at least such an electrical signal.

Advantageously, the optical sensor 100 can comprise one or more of: front photodiode 105, side photodiode 109, and monitor photodiode 21, so that the related electrical signals can be sent and processed by the processing and control unit 15.

Preferably, in the most complete embodiment, the optical sensor 100 comprises all three aforesaid photodiodes.

Advantageously, the grinding device 1 comprises an actuator 17 adapted to operate the at least one grinding member 5. The processing and control unit 15 is configured to adjust the operation of said actuator 17 on the basis of the signal indicative of the grain size of the coffee powder 7.

Advantageously, the processing and control unit 15 is configured to adjust the operation of the actuator 17 on the basis of the signal indicative of the dose of ground coffee powder 7, obtained starting from the processing of the signal indicative of the grain size. Advantageously, in fact, the operation of the grinding member 5 can be interrupted, automatically, once a desired dose of coffee powder 7 has been ground.

Advantageously, the funnel element 12 comprises one or more blades 111 adapted to break up any lumps of coffee powder 7 that form at the exit of the grinding member 5.

Advantageously, the funnel element 12 comprises anti-electrostatic elements 112 adapted to reduce the electrostatic phenomena that may affect the coffee powder 7 exiting the grinding member 5.

Advantageously, the grinding member 5 comprises at least one pair of grinders 41, 43. At least one grinder 41 is advantageously dragged into rotation by the actuator 17, which actuator 17 may advantageously comprise an electric motor.

Advantageously, the rotation speed of the grinders 41, 43, via the actuator 17, can be varied on the basis of the signal indicative of the grain size of the coffee powder 7.

Advantageously, the grain size adjustment device 9 is configured to vary the mutual distance between the grinders 41, 43, for example by moving the grinder 43 with respect to the grinder 41 operated by the actuator 17, so as to vary the sizes of the gap between the two grinders 41, 43.

Advantageously, the grinding device 1 comprises cleaning means 16, configured to clean the optical sensor 100 during use, and in particular to clean the relative sensitive components from the coffee powder 7 that is ground. In particular, the cleaning means 16 comprise blowing elements adapted to keep clean the surfaces of the optical sensor 100 that face the coffee powder 7 exiting the dispensing opening 11, or in gravimetric fall from the funnel element 12. In this way, coffee powder deposit can be prevented on both the radiation source 101 and on the front 105 and side 109 photodiodes, or in any case it can be removed with some frequency. Advantageously, the processing and control unit 15 is also configured to command the activation of the aforesaid cleaning means 16.

The cleaning means 16 may also comprise mechanical members adapted to sweep coffee powder deposits from the surfaces of the optical sensor 100.

Figure 2:
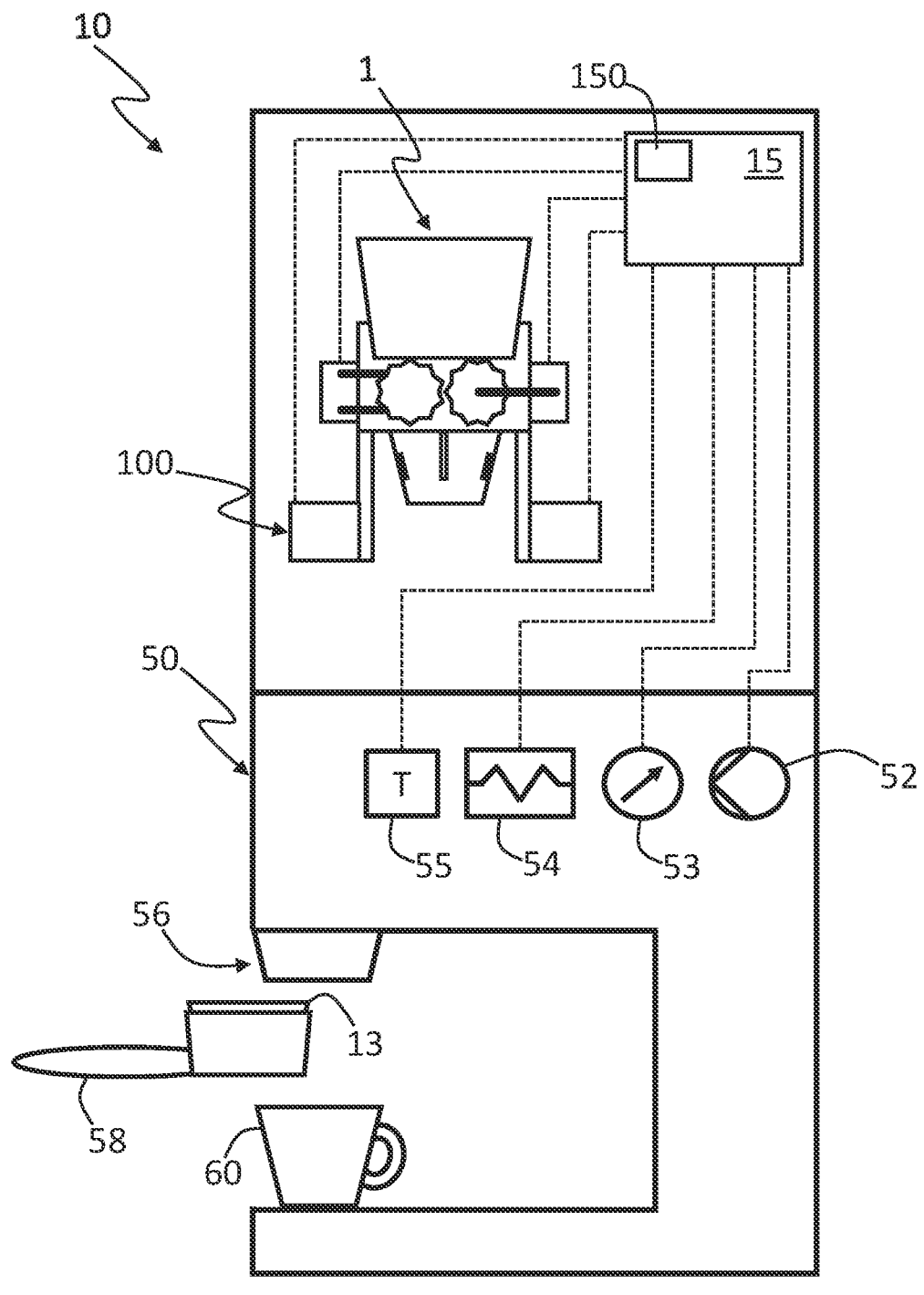
FIG. 2 schematically illustrates a system for dispensing coffee, according to the disclosure, comprising a grinding device associated with a coffee dispensing machine.

As illustrated in FIG. 2, the present disclosure also concerns a system 10 for dispensing espresso coffee comprising a grinding device 1 as described above, and an espresso coffee dispensing machine 50 comprising:

a pump 52;

at least one delivery group 56, wherein the pump 52 is adapted to send water under pressure to the delivery group 56, at least one filter holder 58 adapted to carry the filter 13, wherein said filter holder 58 is associable to the dispensing unit 56 in order to deliver, in a cup 60 (or in two cups in the case of a double-spout filter holder), a dose of espresso coffee obtained by percolation of the water under pressure through the dose of coffee powder 7 contained in the filter 13 carried by the filter holder 58.

The system 10 for dispensing espresso coffee further comprises the processing and control unit 15 connected to the optical grain size sensor 100 and configured to process the signal indicative of the grain size of the coffee powder 7.

This processing and control unit 15 is also configured:

to regulate the operation of the grain size adjustment device 9 on the basis of the signal indicative of the grain size of the coffee powder 7, and to regulate the operation of the pump 52 on the basis of the signal indicative of the grain size of said coffee powder 7.

In fact, as the grain size of the coffee powder 7 in the filter 13 varies, so does the back pressure exerted by the dose of coffee powder 7 when flooded by the water under pressure.

For example, a powder with a finer grain size tends to compact more when flooded with water, and the pressure that the pump 52 must exert to have optimal percolation of the espresso coffee should preferably be increased.

Advantageously, the espresso coffee dispensing machine 50 also comprises a pressure and/or flow rate sensor 53, also connected to the processing and control unit 15, and adapted to generate a signal indicative of the pressure and/or flow rate of the water exiting the pump 52 that can be used by the processing and control unit 15 to vary the operating parameters of the pump 52.

Advantageously, the espresso coffee dispensing machine 50 comprises a water heating device 54 adapted to heat the water sent to a delivery group 56. The processing and control unit 15 is configured to adjust the operation of the heating device 54 on the basis of the signal indicative of the grain size of the coffee powder 7.

Advantageously, the espresso coffee dispensing machine 50 also comprises a temperature sensor 55, also connected to the processing and control unit 15, and adapted to generate a signal indicative of the temperature of the water downstream of the heating device 54, usable by the processing and control unit 15 to vary the operating parameters of the heating device 54.

Advantageously, the processing and control unit 15 is also configured to adjust the operation of the heating device 54 on the basis of the signal indicative of the grain size of the coffee powder 7.

Advantageously, in fact, the processing and control unit 15 is configured to allow the machine 50 to perform a profiling of the flow of water delivered, in terms of pressure, flow rate and temperature, also as a function of the signal indicative of the grain size of the coffee powder 7. In this way, the steps of pre-brewing the dose of coffee present in the filter 13 and of percolating the dispensing water can be performed by optimizing the profiling parameters as a function also of the grain size of the coffee powder 7.

Furthermore, since the grinding device can be advantageously associated with a coffee dispensing machine 50, the processing and control unit 15 is configured to also receive signals indicative of operating parameters of the coffee dispensing machine 50, such as for example the dispensing duration to obtain the espresso coffee in a cup (i.e. the water brewing and percolation time), the temperature and quality of the water (e.g., the hardness thereof, or the presence of chlorine), and/or the working pressure of the pump 52, in order to adjust the operation of the grain size adjustment device 9 on the basis also of such signals indicative of the operating parameters of the machine 50.

Advantageously, the processing and control unit 15 comprises a wireless communication module 150 configured to allow the wireless connection of the processing and control unit 15 to an external terminal, such as a smartphone or other mobile device, and/or to a cloud network.

This makes it possible to store on a cloud network the data relating to the signals detected by the optical grain size sensor 100 and processed by the processing and control unit 15, as well as the signals relating to the operating parameters of the espresso coffee dispensing machine 50.

Advantageously, the grinding device 1 comprises a humidity (and/or temperature) sensor 40 adapted to generate a signal indicative of the ambient humidity (and/or temperature).

Advantageously, the grinding device 1 comprises a temperature sensor 42 adapted to generate a signal indicative of the temperature of the ground coffee powder 7. This signal can be used to monitor whether the temperature of the ground coffee powder 7 remains below a temperature threshold.

Preferably, the coffee powder temperature sensor 42 is a non-contact temperature sensor, such as an infrared temperature sensor.

Advantageously, the processing and control unit 15 is configured to receive signals indicative of ambient and/or atmospheric data, such as the aforesaid signal indicative of the humidity (and/or temperature) of the air, and to adjust the operation of the grain size adjustment device 9 on the basis also of such signals indicative of ambient and/or atmospheric data.

Advantageously, the processing and control unit 15 is configured to receive also signals indicative of the temperature of the ground coffee powder 7 from the coffee powder temperature sensor 42.

Advantageously, the optical sensor 100 may comprise such an ambient humidity (and/or temperature) sensor 40 or the temperature sensor 42 adapted to generate the aforesaid signals, and connected to the processing and control unit 15.

Alternatively, the processing and control unit may receive signals indicative of the atmospheric humidity (and/or temperature) from the internet network, via the wireless communication module 150.

In addition, it is also possible to interface an external terminal to the processing and control unit 15 in order to operate the grain size adjustment device 9 via this external terminal, based on the current grain size value, which value can also be viewed on a display of the external terminal.

The operation of the grinding device and of the system for dispensing coffee is clear and evident from what has been described.

In practice, it was found that the grinding device, according to the present disclosure, fulfils the task as well as the intended purpose in that it allows the grain size of the coffee powder obtained from grinding the coffee beans to be measured and adjusted directly and with high precision.

Another advantage of the grinding device, according to the disclosure, consists in the fact that it can dispense a correct dose of coffee powder starting from the information provided by the optical sensor, without resorting to special scales.

A further advantage of the grinding device, according to the disclosure, consists in the fact that it can continuously and repeatably adjust, near in real time, the grain size of the coffee powder obtained by grinding the coffee beans.

Another advantage of the coffee grinder device, according to the disclosure, consists in the fact that the adjustment of the grinding grain size of the coffee beans can be performed, in a precise and repeatable manner, regardless of the type of coffee beans, their roasting degree, and their humidity.

The coffee grinder device, according to the disclosure, is in fact able to adjust the grinding adjustment parameters to obtain constant and repeatable grain size values even when the above conditions vary. In particular, the possibility of having information about the ambient humidity, through a special sensor, or in any case about the atmospheric humidity, through an internet connection, allows to adjust the grinding taking into account the humidity, since this parameter greatly affects the grinding.

Another advantage of the disclosure consists in being able to identify and report any agglomerations of coffee powder (so-called "clumping") to allow the operator to intervene in order to prevent negative effects on the delivery of coffee due to the presence of such agglomerations.

Another advantage of the grinding device, according to the disclosure, consists in the fact that it is also possible to detect the imminent depletion of the coffee beans in the tank, starting from the detection of a possible reduction in the gravimetric flow of coffee powder exiting the funnel element.

A further advantage of the grinding device, according to the disclosure, consists in the fact that it can be integrated into a system for dispensing coffee which also comprises a coffee dispensing machine. This also makes it possible to control the flow rate, pressure and temperature parameters of the water required to prepare the coffee based on the grain size values of the dose of coffee powder. In addition, it is also possible to do the reverse, i.e. to vary the grain size of the coffee powder according to the optimal parameters of flow rate, pressure and temperature of the water to obtain an optimal espresso coffee.

Yet another advantage of the disclosure consists in the fact it is possible to vary the grain size of the coffee powder while also taking into account the quality of the dispensing water. In fact, water with a low calcareous content, or in general with a low electrical conductivity, has a higher extraction capacity, and therefore it is possible to act on the grain size of the powder in order to compensate for the ability of water to extract aromas from coffee. The coffee grinder device thus allows to vary the grain size of the coffee powder based on the hardness of the water.

The coffee grinder device thus conceived, as well as the system for dispensing coffee comprising it, are susceptible to numerous modifications and variations all falling within the scope of the inventive concept.

Furthermore, all the details can be replaced by other technically equivalent elements.

In practice, any materials can be used according to requirements, as long as they are compatible with the specific use, the dimensions and the contingent shapes.

The invention claimed is:

1. A grinding device, particularly for coffee, the grinding device comprising:

a tank of coffee beans, at least one grinding member adapted to grind a quantity of coffee beans to obtain a coffee powder, a grain size adjustment device adapted to adjust at least one operating parameter of said grinding member to vary the grain size of said coffee powder, and a dispensing opening adapted to deliver said coffee powder towards a container adapted to receive said coffee powder, the grinding device further comprises, in correspondence with or downstream of said dispensing opening, an optical grain size sensor adapted to intercept said coffee powder exiting said dispensing opening and to generate at least a signal indicative of the grain size of said coffee powder, the grain size of said coffee powder being selectable by said grain size adjustment device on the basis of said signal indicative of the grain size of said coffee powder, wherein said optical grain size sensor comprises a radiation source adapted to generate a radiation which strikes said coffee powder exiting said dispensing opening along an irradiation direction incident to the exit direction of said coffee powder, said optical grain size sensor further comprising at least one front photodiode placed substantially along said irradiation direction on a side opposite to said radiation source with respect to said coffee powder exiting said dispensing opening, said at least one front photodiode generating a first electrical signal dependent on the part of radiation that passes through said coffee powder exiting said dispensing opening, said grinding device comprising a processing and control unit connected to said optical grain size sensor configured to receive said first electrical signal of said at least one front photodiode and to process said at least one signal indicative of the grain size of said coffee powder on the basis of at least said first electrical signal.

2. The grinding device according to claim 1, further comprising a processing and control unit connected to said optical grain size sensor configured to receive said at least one signal indicative of the grain size of said coffee powder and to adjust the operation of said grain size adjustment device on the basis of said at least one signal indicative of the grain size of said coffee powder.

3. The grinding device according to claim 1, further comprising a processing and control unit connected to said optical grain size sensor configured to receive said at least one signal indicative of the grain size of said coffee powder, said processing and control unit being further configured (i) to receive a signal indicative of a reference grain size for said coffee beans and (ii) to adjust the operation of said grain size adjustment device on the basis of said signal indicative of said reference grain size for said coffee beans.

4. The grinding device according to claim 1, wherein said dispensing opening comprises a funnel element adapted to convey, by gravimetric fall, said coffee powder towards said container.

5. The grinding device according to claim 1, wherein said radiation source comprises a laser source, said radiation comprising a laser light beam, said front photodiode generating a first electric signal dependent on the modulation of the power of said laser light beam operated, according to a retro-injection interferometry effect, by the particles of said coffee powder exiting said dispensing opening.

6. The grinding device, according to claim 1, wherein said optical grain size sensor comprises a radiation source adapted to generate a radiation which strikes said coffee powder exiting said dispensing opening along an irradiation direction incident to the exit direction of said coffee powder, said optical grain size sensor further comprising a lateral photodiode placed along a diffusion direction substantially orthogonal to said irradiation direction (R), said lateral photodiode generating a second electrical signal dependent on the part of radiation that is diffused by said coffee powder exiting said dispensing opening substantially along said diffusion direction, said grinding device comprising a processing and control unit connected to said optical grain size sensor configured to receive said second electrical signal of said lateral photodiode and to process said at least one signal indicative of the grain size of said coffee powder on the basis of at least said second electrical signal.

7. The grinding device according to claim 6, further comprising both said front photodiode and said side photodiode, said processing and control unit connected to said optical grain size sensor being configured to receive said first electrical signal of said front photodiode and said second electrical signal of said lateral photodiode and to process said at least one indicative signal of the grain size of said coffee powder on the basis of said first electrical signal and of said second electrical signal.

8. The grinding device according to claim 1, wherein said optical grain size sensor comprises a radiation source comprising a laser source and a monitor photodiode associated with said laser source, said radiation source being adapted to generate a radiation which strikes said coffee powder exiting said dispensing opening along a direction of irradiation incident to the exiting direction of said coffee powder, said monitor photodiode generating a further electrical signal depending on the part of radiation that passes through said coffee powder exiting said dispensing opening, said grinding device comprising a processing and control unit connected to said optical grain size sensor configured to receive said further electrical signal of said monitor photodiode and to process said at least one indicative signal of the grain size of said coffee powder on the basis of at least a further electrical signal (106).

9. The grinding device according to claim 1, further comprising a processing and control unit connected to said optical grain size sensor configured to receive said at least one signal indicative of the grain size of said coffee powder and in that it comprises an actuator adapted to operate said at least one grinding member, said processing and control unit being configured to regulate the operation of said actuator on the basis of said signal indicative of the grain size of said coffee powder.

10. The grinding device according to claim 1, further comprising cleaning means, configured to clean said optical grain size sensor from the deposit of said coffee powder on the surfaces of said optical grain size sensor itself.

11. The grinding device according to claim 1, further comprising a humidity and/or temperature sensor adapted to generate a signal indicative of the ambient humidity and/or the ambient temperature, said processing and control unit being connected to said humidity and/or temperature sensor and being configured (i) to receive said signal indicative of the ambient humidity and/or ambient temperature and (ii) to regulate the operation of said grain size adjustment device on the basis of said signal indicative of the ambient humidity and/or ambient temperature.

12. The grinding device according to claim 1, configured to be associated with an espresso coffee dispensing machine, said grinding device further comprising a processing and control unit configured (i) to receive at least one signal indicative of an operating parameter of said espresso coffee dispensing machine and (ii) to regulate the operation of said grain size adjustment device on the basis of said at least one signal indicative of an operating parameter of said espresso coffee dispensing machine.

13. A method of grinding coffee beans with a grinding device according to claim 1, the method including the following steps:
    (i) selecting a desired grain size value for said coffee powder,
    (ii) acquiring said at least one signal indicative of the grain size of said coffee powder exiting said dispensing opening,
    (iii) obtaining a current grain size value of said coffee powder exiting said dispensing opening on the basis of said signal,
    (iv) comparing said current grain size value with said desired grain size value, and
    (v) operating said grain size adjustment device to vary the current grain size of said coffee powder on the basis of said comparison of said current grain size value with said desired grain size value.

14. The method of grinding coffee beans according to claim 13, further including the step of processing with said processing and control unit, said signal indicative of the grain size of said coffee powder to estimate a signal indicative of the quantity of ground coffee powder.

15. A system for dispensing espresso coffee comprising a grinding device and a machine for dispensing espresso coffee, said grinding device comprising:
    a tank of coffee beans,
    a grinding element adapted to grind a quantity of coffee beans to obtain a dose of coffee powder,
    a grain size adjustment device adapted to adjust at least one operating parameter of said grinding member to vary the grain size of said coffee powder,
    a dispensing opening adapted to deliver said dose of coffee powder towards a filter adapted to receive said dose of coffee powder,
    said grinding device further comprising, in correspondence with or downstream of said dispensing opening, an optical grain size sensor adapted to intercept said dose of coffee powder exiting said dispensing opening and to generate a signal indicative of the grain size of said dose of coffee powder,
    said machine for dispensing espresso coffee comprising:
        a pump;
        at least one delivery group, said pump being adapted to send water under pressure to said at least one delivery group,
        at least one filter holder adapted to carry said filter, said at least one filter holder being associable to said at least one dispensing unit to deliver a dose of espresso coffee into a cup obtained by percolation of said water under pressure through said dose of coffee powder contained in said filter;
    said system for dispensing espresso coffee further comprising a processing and control unit connected to said optical grain size sensor configured to receive said at least one signal indicative of the grain size of said coffee powder, said processing and control unit being further configured:
    to regulate the operation of said grain size adjustment device on the basis of said signal indicative of the grain size of said coffee powder, and
    to regulate the operation of said pump on the basis of said signal indicative of the grain size of said coffee powder.

16. The system for dispensing espresso coffee according to claim 15, wherein said machine for dispensing espresso coffee comprises a water heater device adapted to heat said water sent to said at least one dispensing unit, said processing and control unit being further configured to regulate the operation of said heating device on the basis of said signal indicative of the grain size of said dose of coffee powder.

* * * * *